United States Patent [19]

Pacini et al.

[11] Patent Number: 4,554,416
[45] Date of Patent: Nov. 19, 1985

[54] LOW VOLTAGE TWO WIRE TO FOUR WIRE TELEPHONE CIRCUIT CONVERTER APPARATUS

[75] Inventors: Dino J. Pacini, Utica; Edward C. Miceli, Verona; Norman J. Sturdevant, Jr., Rome, all of N.Y.

[73] Assignee: The United States of America as represented by the Secretary of the Air Force, Washington, D.C.

[21] Appl. No.: 473,384

[22] Filed: Mar. 8, 1983

[51] Int. Cl.⁴ .................................................. H04B 1/58
[52] U.S. Cl. ................................. 179/170 NC; 179/37
[58] Field of Search .............. 179/170 NC, 170 R, 37, 179/38, 39, 40, 29, 81 D

[56] References Cited

U.S. PATENT DOCUMENTS

| | | | |
|---|---|---|---|
| 2,929,883 | 3/1960 | Durbin et al. | 179/29 X |
| 3,150,236 | 9/1964 | Gorgas et al. | 179/18 |
| 3,917,907 | 11/1975 | Bartelink | 179/18 AF |
| 4,041,252 | 8/1977 | Cowden | 179/170 NC |
| 4,161,633 | 7/1979 | Treiber | 179/170.2 |
| 4,232,293 | 11/1980 | Harris | 340/147 R |
| 4,306,313 | 12/1981 | Baldwin | 455/601 |

*Primary Examiner*—James L. Dwyer
*Attorney, Agent, or Firm*—Donald J. Singer; William Stepanishen

[57] ABSTRACT

A low voltage two wire to four wire telephone circuit converter apparatus utilizing a series pair of amplifiers to provide a transmit data out signal that is referenced to analog ground. A pair of amplifiers in parallel to receive a receive data in signal which is referenced to analog ground and apply it to the telephone unit. A signal adapter converts the telephone ring signal to a constant one level for transmission over a digital channel in a fiber optic link.

4 Claims, 1 Drawing Figure

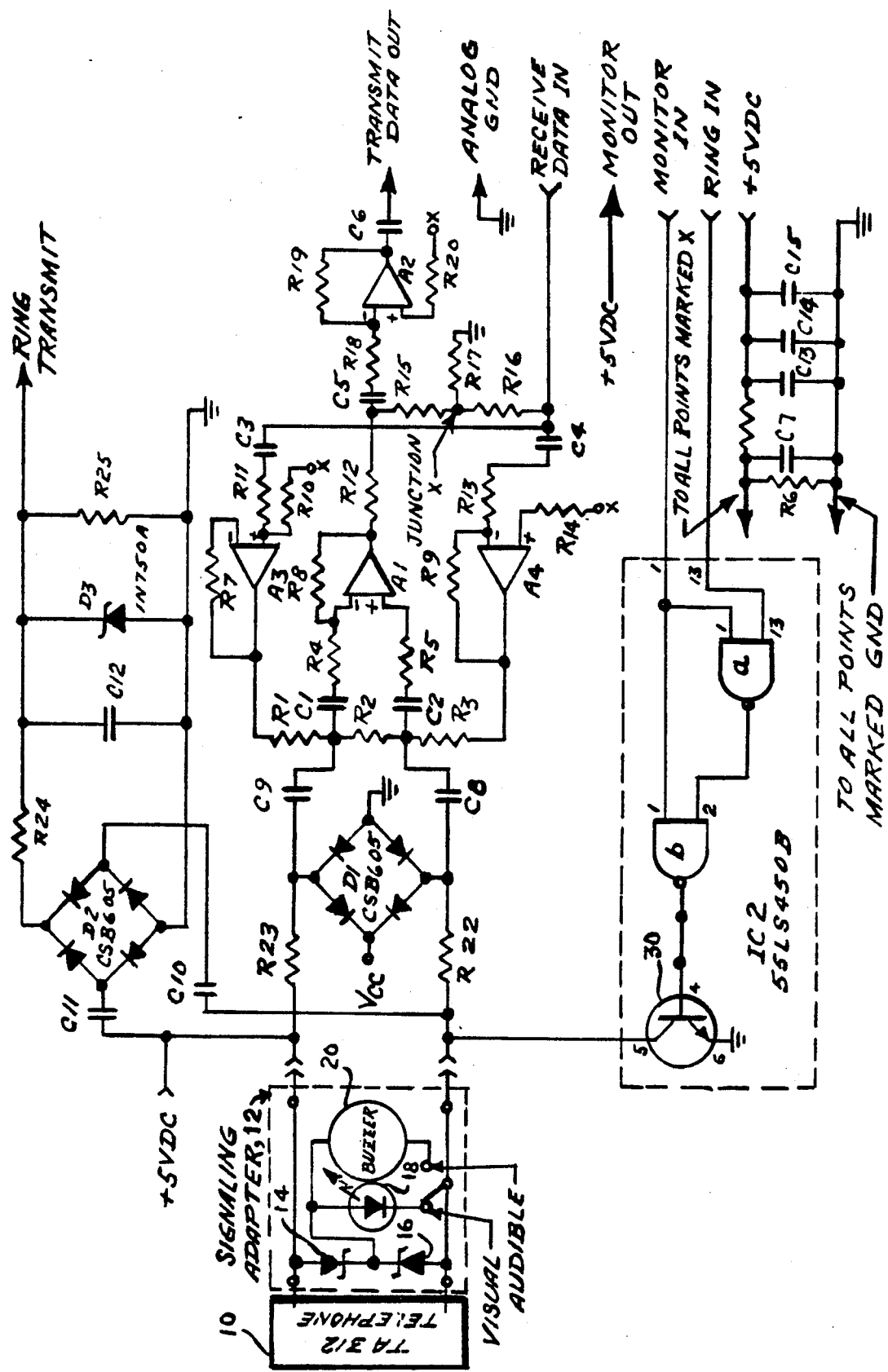

LOW VOLTAGE TWO WIRE TO FOUR WIRE TELEPHONE CIRCUIT CONVERTER APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to a telephone circuit converter apparatus, and in particular to a low voltage two wire to four wire telephone circuit converter apparatus for use with a four wire, full duplex fiber optic voice transceiver.

In the prior art, voice and low speed data communications networks generally utilize two-wire trunks as the transmission medium. With the advent of complex long distance voice communication networks, it was necessary to utilize four-wire trunks as the individual segments of the over-all transmission path. These four-wire trunk systems provided communication paths of greater transmission efficiency and higher fidelity.

It is therefore highly desirable in high speed data communication systems to employ four-wire station-to-station connections. High speed data is presently transmitted over four-wire private lines which are connected, either directly between the transmitting station and the receiving station, or through manual switching centers which are provided for high speed data communication networks. While low speed data and voice communications may presently be handled over circuits containing both two-wire and four-wire trunks, this dual type of wiring combination is not suitable for high speed data transmission. In addition, separate switching centers are currently necessary for two-wire and four-wire trunk facilities. While the two-wire switching centers are used as originating and terminating switching centers, the four-wire switching centers are only used as intermediate toll switching centers. Since the four-wire switching centers are located at widely dispersed locations, they may also serve as toll centers for a large number of two-wire switching centers.

As the demand for high speed data communication increases, it is highly probable that customers will be located at a considerable distance from one another and from the four-wire station transmission facilities. Thus, it would be highly desirable to terminate and switch these four-wire facilities at the local two-wire switching centers that are close to the customer and currently serve the customer for voice and low speed data communications.

SUMMARY OF THE INVENTION

The present invention utilizes a telephone circuit converter to interface a two wire field telephone to a four wire pulse code modulation encoder/decoder circuit. The telephone converter apparatus utilizes signal converters and channel multiplexers to transmit and receive voice signals.

It is one object of the present invention, therefore, to provide an improved low voltage two wire to four wire telephone circuit converter apparatus.

It is another object of the invention to provide an improved low voltage two wire to four wire telephone circuit converter apparatus which operates in a four wire, full duplex fiber optic voice transceiver.

It is another object of the invention to provide an improved low voltage two wire to four wire telephone circuit converter apparatus which converts a two wire telephone circuit to a four wire telephone interface to permit its use on a four wire pulse code modulation (PCM) encoder/decoder circuit.

It is another object of the invention to provide an improved low voltage two wire to four wire telephone circuit converter apparatus which operates from a single +5 VDC low voltage supply.

These and other advantages, objects and features of the invention will become more apparent after considering the following description taken in conjunction with the illustrative embodiment in the accompanying drawings.

BRIEF DESCRIPTION OF THE DRAWINGS

The sole FIGURE is a schematic diagram of the low voltage two wire to four wire telephone circuit converter apparatus according to the present invention.

DESCRIPTION OF THE PREFERRED EMBODIMENT

Referring now to the sole FIGURE there is shown a detailed schematic circuit diagram of the two to four wire (2/4) telephone converter apparatus which is used to interface the TA-312 field type, order wire telephone to a four wire input, pulse code modulation (PCM) encoder/decoder circuit which may be utilized in a special optical voice transceiver system (not shown). A conventional two-wire to four wire converter requires that relatively high DC voltages from an external source be available for proper circuit operation. The telephone converter apparatus herein described operates from a single, +5 VDC power source.

The voice transmission portion of the two to four wire telephone converter apparatus will be discussed first. When the TA-312 field telephone unit 10 is taken off-hook and the transmit button is held down, the voice frequency waveform is passed from the telephone unit 10 over two wires, through the signaling adapter unit 12 and to the 2/4 wire telephone converter circuit. The signaling adapter unit 12 circuitry is not involved in this portion of the circuit and will not be discussed at this time. In the telephone converter circuit, the voice frequency (VF) signal passes through the current limiting resistors R22 and R23 to diode rectifier network, D1. The diode rectifier network D1 provides added protection from the possible high voltage transient surges which may occur on the input wire pair to the telephone converter circuit. Capacitors C8 and C9 are utilized to prevent any DC voltage components from reaching the input (receive) amplifier units A3 and A4. The outgoing voice frequency (VF) signal is amplified by the transmit amplifier units A1 and A2 before appearing across the transmit data out line and the analog ground line. The transmit data out line and the analog ground line form the two wire telephone input pair which is connected to the transmit input of the pulse code modulation (PCM) encoder unit (not shown).

On the receive side of the telephone converter circuit, the two wire input pair which is labeled appears across receive data in and analog ground receives the input telephone signals from the decoder portion of the pulse code modulation (PCM) circuit (not shown). The resistor network which is comprised of resistors R15, R16 and R17 insures that the majority of the received VF signal is coupled through the capacitors C3 and C4 to the receive amplifier units A3 and A4. A portion of the amplified VF signal from the receiver amplifier units A3 and A4 is coupled back through capacitors C1 and C2 to the transmit amplifier unit A1. This feedback signal acts in a degenerative manner to help eliminate retransmission of the received signal. The cancellation takes place at junction which is labeled Junction X.

The operation of the signaling adapter and monitoring unit 12 will now be discussed. In the normal operating mode, the telephone call signal to a remote or another telephone station in the communications net occurs when the operator at the local end or calling station turns the crank on the side of the field telephone. This cranking action produces a 100 volt peak-to-peak signal at a frequency of 20 Hz on the line. At the distant end or receiving station this voltage is sufficient to ring the bell of the field telephone located thereat. The introduction of optical cable and its associated electronics, such as the pulse code modulation (PCM) circuitry, created a number of conditions which can prevent the use of this calling procedure. Firstly, the 100 volt calling signal cannot be passed over an optical cable. Secondly, the dynamic range of the pulse code modulation (PCM) device is insufficient to pass a signal of that magnitude. Finally, with the voltages available, the 100 volt calling signal cannot be recreated with sufficient current to activate the bell at the distant end. These requirements make it necessary to devise an alternate method for signaling.

In the optical transceiver application, the use of the hand telephone crank on the side of the initiating or calling unit was maintained. However, the audible tone at the distant end is now produced by a buzzer 20 which is located in the signaling adapter unit 12. It is to be understood that all telephone units in a given communications net would all be equipped with the present two to four wire telephone converter apparatus. This same buzzer is used as an alarm to alert personnel of a failure in the system and will be explained later. When the hand crank on the side of the field telephone unit 10 is turned, the unit still produces the 100 volt peak-to-peak, 20 Hz signal across the output wire pair into the telephone converter apparatus. The zener diodes 14 and 16 in the signaling adapter unit 12 prevent the 100 volt signal from destroying the internal visual indicator 18 and the buzzer unit 20. The diode network D1 limits the ringing signal between ground and +5 VDC (Vcc) to the voice amplifier area of the telephone converter circuit.

The resulting 20 Hz input waveform (ring signal) is coupled across the capacitors C10 and C11 to the bridge rectifier unit D2. The circuit which is formed by diode network D2, resistor R24, capacitor C12 and zener diode D3 convert the ring signal to a constant "1" level. This signal which appears on the ring transmit line is sent to a special overhead digital channel (not shown) which is contained in the transceiver unit (not shown).

The overhead channel of the transceiver is terminated by a digital register pair at each end of the optical link. This channel has the capacity of transferring fourteen (14) independent digital levels (waveforms) across the optical link. The bandwidth of each of the 14 digital ports is from DC to 2.2 kilobits/sec. One of these 14 bit positions in the digital channel is used to transfer the ring signal to the distant transceiver.

At the remote transceiver the copied ring request is the output signal from the receive digital register and will appear at the ring in input line as shown on the lower right side of the FIGURE. The normal input levels to pins 1 and 13 of integrated circuit IC2 are as follows: pin 1 (monitor input) high (+5) and the ring input low (ground). The operation of the monitor input line will be explained later. With these conditions present, the output of NAND gate a is high. This satisfies the conditions at NAND gate b to keep the output at a low level. A ground potential to the base (pin 4) of the transistor unit 30 holds it in a non-conducting state. If either input pin to NAND gate b becomes a low level, the output then becomes a high level and results in the transistor unit 30 being turned on (conducting). This completes a path for ground through the transistor unit 30, through the buzzer unit 20 or visual indicator 16, to the +5 volt source which is connected between the signaling adapter unit 12 and capacitor C11. One way that the output of NAND gate b becomes high, enabling the alarm circuit, is for the monitor input line to become low. This will be discussed next. The second way which is relevant to the signaling discussion is for the input to pin 13 of NAND gate a to become high. This happens when the ring input line is copying the ring request from the distant end.

The monitor operation which is very basic and very vital to the use of the transceiver system will now be discussed. In operation, the transceiver unit and optical componentry is located on the outside of the unit telephone shelter while the operations area is inside. Without the monitor capability, the only way to determine system availability would be to conduct continuous circuit checks. The monitor circuit will sound an alarm whenever there is a failure of the system at either end of the communications net or the optical cable between. This monitor function is accomplished by passing a high level from one end, through the system to the other end and returning the signal to the same end. This monitor operation also uses the digital channel to copy the level in both directions. Any breakdown in this path would result in the loss of the high level input to pin 1 of integrated circuit IC2 and thus enabling the alarm. The voltage source for the monitor level signal originates on the same board. The signaling adapter unit 12 may be used without the telephone unit for system monitor function.

Although the invention has been described with reference to a particular embodiment, it will be understood to those skilled in the art that the invention is capable of a variety of alternative embodiments within the spirit and scope of the appended claims.

What is claimed is:

1. A low voltage two wire to four wire telephone circuit converter apparatus comprising in combination
   a telephone means utilizing two wires to receive input signals and to transmit output signals; said telephone means having a transmit button to send voice frequency singals;
   a first and second means for amplifying connected in series, said first amplifying means receiving said voice frequency signals from said telephone means by means of said two wires therefrom, said first amplifying means amplifying said voice frequency signals and applying them to said second amplifying means said second amplifying means further amplifying said voice frequency signal to provide a transmit data out signal, said transmit data out signal being referenced to analog ground;

a third and fourth means for amplifying arranged in parallel, said third and fourth amplifying means both receiving a receive data in signal, said third and fourth amplifying means each amplifying said receive data in signal and applying it to said telephone means by means of said two wire of said telephone means, and;

a low voltage source to supply a low voltage DC signal to said second, third and fourth amplifying means respectively; and further including a signal adapted means connected to said telephone means to receive an alternating ring signal therefrom, and a signal converting means converting said ring signal to a ring transmit signal which is a constant logic one level, said signal adapter means receiving a ring in signal which activates said signal adapter means to indicate a telehphone call is incoming.

2. A low voltage two wire to four wire telephone circuit converter apparatus as described in claim 1 wherein said low voltage source provides a positive 5 volts DC.

3. A low voltage two wire to four wire telephone circuit converter apparatus as described in claim 1 wherein said signal adapter means includes a visual indicator means.

4. A low voltage two wire to four wire telephone circuit converter apparatus as described in claim 1 wherein said signal adapter means includes an audible indicator means.

* * * * *